C. A. HOWELL.
RESILIENT WHEEL.
APPLICATION FILED AUG. 20, 1912.
1,057,152.
Patented Mar. 25, 1913.
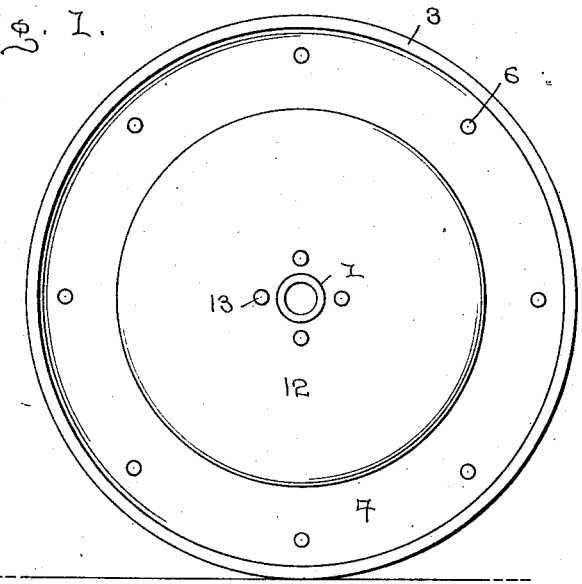
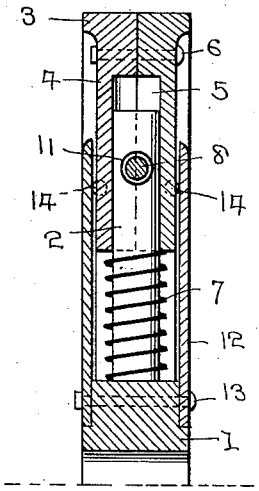
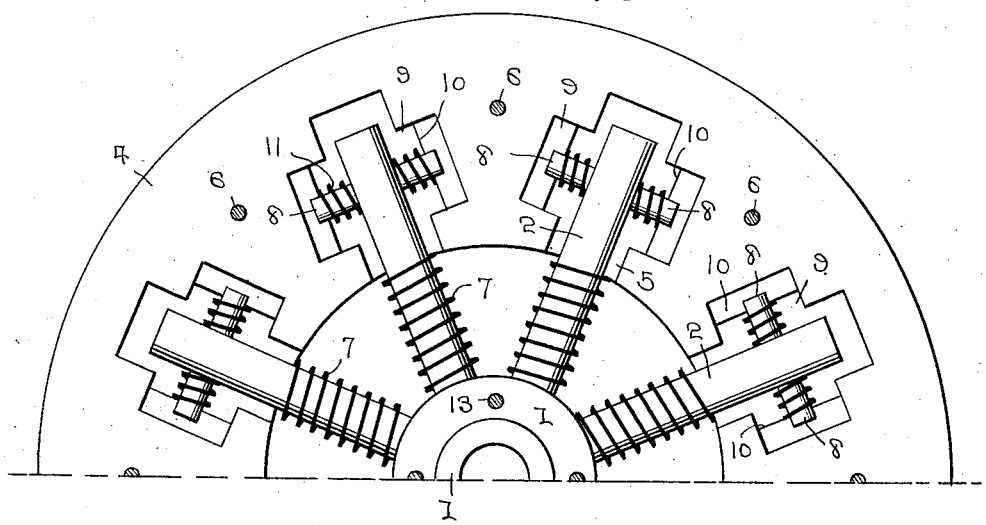
Witnesses
Inventor
C. A. Howell
By W. J. FitzGerald & Co.
Attorneys

UNITED STATES PATENT OFFICE.

CHARLES A. HOWELL, OF HOWE, NEBRASKA.

RESILIENT WHEEL.

1,057,152.  Specification of Letters Patent.  Patented Mar. 25, 1913.

Application filed August 20, 1912. Serial No. 716,074.

*To all whom it may concern:*

Be it known that I, CHARLES A. HOWELL, a citizen of the United States, residing at Howe, in the county of Nemaha and State of Nebraska, have invented certain new and useful Improvements in Resilient Wheels; and I do hereby declare the following to be a full, clear, and exact description of the invention, such as will enable others skilled in the art to which it appertains to make and use the same.

My invention relates to improvements in vehicle wheels, and particularly to that class known as resilient wheels.

The object of my invention is to provide resilient connections between the hub and rim, and also between the spokes and rim, whereby the load is resiliently supported, and the shocks incident to abrupt starting or stopping of the vehicle are entirely absorbed within the wheel.

Another object is to provide a wheel wherein relative lateral or rocking movement of the hub and rim is positively prevented.

In the accompanying drawings, Figure 1 is a side elevation of a wheel constructed in accordance with my invention. Fig. 2 is a similar view of a portion of the wheel, in which several of the parts are removed, and, Fig. 3 is a vertical sectional view through a portion of the wheel, taken at right angles to Fig. 2.

Referring to the drawings, 1 represents a hub, and 2 the spokes projecting radially therefrom. The rim 3 is formed in two parts, each of the parts being provided with inwardly directed flanges 4, the abutting faces of which are provided with radial sockets or seats 5 for the reception of the spokes 2. The parts of the rim 3 are adapted to be held together by means of suitable bolts 6, which take through said rim at spaced intervals. For resiliently centering the hub 1 within the rim 3, springs 7 are provided and positioned over the spokes 2, between the periphery of the hub 1 and the inner faces of the parts of the rim 3.

As shown in Figs. 2 and 3, the seats 5 for the spokes are formed by recessing the abutting faces of the parts of the rim 3 a sufficient depth to accommodate one-half of the spokes 2, the width of said recesses however, being greater than the diameter of said spokes, whereby the hub is allowed a limited rotary movement within the rim 3, but relative rocking or lateral movement of the two parts is prevented.

In order to resiliently center the spokes 2 within the seats 5, I provide the ends thereof with right angularly extending arms 8, which are mounted in the auxiliary seats 9 formed in the side walls of the seats 5. The opposite extremities of the auxiliary seats 9 are reduced to provide shoulders 10, against which bear the springs 11 mounted over the arms 8, the opposite ends of said springs being engaged against the spokes 2. As clearly shown in Fig. 2, the auxiliary seats 9 are of sufficient width as to allow the arms 8 free movement transversely therein when the spokes are moved to accommodate the radial movement of the spokes between the parts.

The hub 1 is provided upon opposite faces thereof with flanges 12, removably secured thereto by bolts 13. The flanges 12 are of sufficient size to partially overlap the inwardly directed flanges 4 of the rim 3, while the side faces of said inwardly directed flanges are provided with seats within which are positioned bearing balls 14, against which the inner faces of the flanges 12 are engaged.

From the foregoing, it will be seen that I have provided a spring wheel having a rim yieldably or resiliently supported from the hub, whereby shocks imparted to the hub are absorbed between the hub and the rim. It will be further seen that I have provided a spring wheel of considerable strength, and one in which the shocks incident to abrupt starting and stopping of the vehicle are effectively absorbed by resilient means positioned between the spokes and the rim of the wheel.

What I claim is:—

A spring wheel comprising a hub and spokes projecting radially therefrom, a two part rim, seats within said rim for movably receiving the outer ends of said spokes, resilient means disposed between the hub and the rim, auxiliary seats formed in the side walls of said first mentioned seats having the opposite extremities thereof reduced to form shoulders, cross arms carried by said spokes and movably positioned within said auxiliary seats, the extremities of said cross arms extending into the reduced ends of said resilient seats, springs carried by each of said cross arms disposed between the spokes and the shoulders formed at the reduced ends of the auxiliary seats.

In testimony whereof I have signed my name to this specification in the presence of two subscribing witnesses.

CHARLES A. HOWELL.

Witnesses:
E. A. RHODES,
J. A. MAYER.

Copies of this patent may be obtained for five cents each, by addressing the "Commissioner of Patents, Washington, D. C."